July 30, 1963     L. B. BORST     3,099,745

TEMPERATURE MEASURING METHOD AND APPARATUS

Filed April 25, 1960

*INVENTOR.*
LYLE B. BORST

BY

AGENT

United States Patent Office 3,099,745
Patented July 30, 1963

3,099,745
TEMPERATURE MEASURING METHOD AND APPARATUS
Lyle B. Borst, Ossining, N.Y., assignor to North American Philips Company, Inc., New York, N.Y., a corporation of Delaware
Filed Apr. 25, 1960, Ser. No. 24,323
9 Claims. (Cl. 250—83.1)

This invention relates to a method for measuring temperatures, and to apparatus for carrying out such a method.

Situations arise where it would be desirable to have available a technique for measuring the temperature of an event occurring within a closed system, where access by ordinary thermometers is not possible or might interfere with the occurring event. In addition, present thermometers for measuring extremely low temperatures, say, below 20° K., are not sufficiently accurate and are cumbersome to operate. Below 1° K., no thermometers are available, the major difficulty being in establishing thermal equilibrium between a body at such a low temperature with its poor thermal conductivity and a physical portion of the thermometer without changing the temperature of the cold body.

I have invented a novel thermometer based upon a totally new concept in the temperature-measuring art. In its broadest aspect, I introduce uncharged particles into the substance or body whose temperature is to be measured, and then I detect and measure those particles that emerge from the substance or body and that have reached thermal equilibrium with the substance or body. Finally, I determine the energy of these emerging particles, and from that information, I am able to determine the temperature of the substance or body. In the preferred form of my invention, I employ neutrons as the uncharged particles. Neutrons have the advantages that sources are readily available, that they are easily detected, and that they possess good penetrating power. Thus, they can readily be introduced into a substance or body whose temperature is of interest and which is confined within a closed box or system.

My invention will now be described in greater detail with reference to the accompanying drawing, in which.

Figure 1:
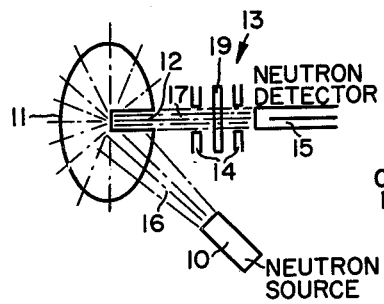
FIG. 1 shows diagrammatically one form of apparatus of my invention.

Referring now to FIG. 1, the preferred form of apparatus of my invention comprises a source of neutrons 10. This may be any substance or device capable of generating neutrons. For example, it may be a nuclear reactor or pile, or a cyclotron. Or, it may be a Van de Graaff generator. Preferably it is a radioactive material which during its spontaneous decay alone or in combination with other materials emits neutrons. This makes for a very compact source of neutrons of known energy. Other particles and radiations may also be emitted from such a source, but this is not important if they do not interact with the substance or body whose temperature is to be measured. On the other hand, if they are undesired, they may be filtered out by well known expedients, or corrections made for their presence. A suitable neutron-generating radioactive material is radium chloride intimately mixed with beryllium metal powder. This source produces neutrons with 3–5 mev. energy. It may be desired to reduce the energy of the neutrons to what they would possess if in equilibrium with the ambient. This conversion to what is referred to as "thermal" neutrons may be obtained by surrounding the source with a moderator. A suitable moderator for the specific source mentioned above is ice, with a radius of about 5 cm.

The body or substance whose temperature is to be measured is shown schematically at 11. It is provided with a bore or well or aperture designated 12.

The detecting system is designated 13, and comprises two collimators 14, which may be members capable of stopping neutrons, e.g. of boron, and containing central apertures through which neutrons may pass, and a detector 15. The neutron detector 15 may be of any conventional type. It may constitute a series of indium foils which are made radioactive, when bombarded by neutrons, to an extent determined by the energy of the bombarding neutrons. By measuring their radioactivity, the energy of the neutrons may be determined. However, I prefer to use a boron trifluoride proportional counter of conventional construction, as it is simpler and more convenient to use. These detectors are well known in the art, and reference is had to "Nuclear Physics" by Kaplan, published in 1955 by Addison-Wesley Publishing Co., Inc., of Cambridge, Mass., chapter 18–2, for a suitable description of such devices and the manner of their use.

The information produced by a boron trifluoride counter is in the form of a succession of electrical pulses, each pulse corresponding to the production within the counter by the entering neutron of an ionizing event. The energy of the incident neutron determines the probability of an ionizing event occurring, which in turn determines the number of output pulses from the counter. These output pulses may be amplified and then counted in conventional scaler circuits, and the results conventionally indicated by a chart recorder or counting meter. The usual technique for neutron counting is to indicate the results in terms of numbers of counts or output pulses per minute, which is called the counting rate. The counting rate is a measure of the flux of the incident neutrons, with low counting rtaes representing low flux and vice versa.

Figure 2:
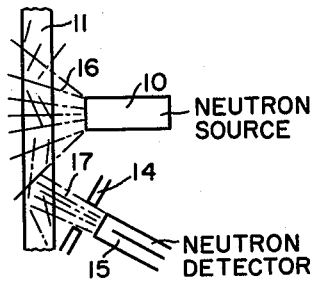
FIG. 2 shows a modification.

The relationship of the neutron source 10 and detecting system 13 relative to the body 11 is chosen so that those neutrons which have attained thermal equilibrium with the body 11 will be detected. This process, also called "thermalizing," involves non-reacting elastic or inelastic collisions between the incident neutrons 16 from the source 10 and nuclei within the body 11. If these incident neutrons survive resonance capture, they eventually become "thermalized," which means that they then possess kinetic energy which is of the same order as that due to thermal motion of the nuclei in the body, and they neither gain nor lose energy statistically. They possess a Maxwellian distribution in velocity and energy, and simply diffuse through the body until they emerge or are captured. The incident neutrons 16 have the energy imparted to them by their generating source 10, or a lower energy resulting from their passage through a moderator. In the moderator, they undergo a series of non-reacting collisions which results in their losing energy to the moderator. For instance, about eighteen collisions of a neutron with an initial energy of 1–5 million electron volts with a moderator such as $H_2O$ will reduce its energy to about $\frac{1}{40}$ of an electron volt, equivalent to a temperature of 300° K. Assume now that neutrons of this energy compose the beam 16, and that the body 11 is at the temperature of liquid helium, about 4° K. The neutrons in the beam 16 will penetrate the body or substance 11 and undergo energy-dissipating non-reacting elastic and inelastic collisions with the nuclei of the body 11. By suitable control, it can be ensured that each entering neutron will undergo a sufficient number of collisions to reduce its energy to about $\frac{1}{4000}$ electron volt, equivalent to a temperature of 4° K. Thus, by undergoing sufficient numbers of collisions the incident neutrons become "thermalized" and now possess an energy corresponding to the temperature of the body 11. As the neutrons are uncharged, no surface work functions or boundary potentials exist to maintain the "thermalized" neutrons within the body. Thus, the uncaptured neutrons will emerge from the body in all directions. Some of these neutrons will enter the cavity 12 and diffuse toward the collimators 14, pass through their central apertures, and finally enter the detector 15 producing a number of ionizing events. The apparatus is arranged to ensure that principally "thermalized" neutrons enter the detector 15. Thus, the collimators 14 will arrest or bar those neutrons which are scattered from the surface of the body 11, or those which only undergo a few collisions before emerging without becoming "thermalized." The well or bore 12 assists this action by collecting neutrons 17 from deep within the body 11, which means that they must have undergone a large number of collisions in order to reach the interior of the body from the surface. To ensure this action, the bore depth should exceed its diameter, and the collimator is arranged so that only those neutrons which emerge from deep within the bore will reach the detector. For thin bodies 11, the geometry illustrated in FIG. 2 may be selected. In this arrangement, the neutron source 10 is non-registered with the detector 15. This avoids the detection of those neutrons which pass directly through the body 11 and undergo insufficient collisions to become "thermalized." Others of the neutrons will diffuse through the body undergoing further collisions, and some will emerge as a beam 17 which can then be detected. Thus, by increasing the length of path of material through which the neutrons must pass before being detected, it can be ensured that they become "thermalized."

Figure 4:
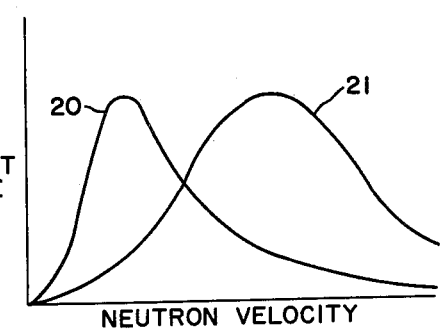
FIG. 4 is a graph of the velocity distribution of "thermalized" neutrons.

Now let us consider how the counting rate of the detector can be employed to determine the temperature of the body or substance 11. When the neutrons become "thermalized," they exhibit not a fixed velocity or energy, but a distribution of velocities corresponding to the well known Maxwell distribution. There exists for each different tempearture of the substance or body 11 a unique Maxwellian velocity distribution of its "thermalized" neutrons. Thus, to determine the temperature of the body, it is merely necessary to determine the velocity distribution of the emerging "thermalized" neutrons. Such a velocity distribution corresponding to neutrons at a temperature of 4° K. is illustrated by the curve 20 in the graph of FIG. 4, whose abscissa represents neutron velocities, and whose ordinate represents the numbers of those neutrons at a particular velocity. Curve 21 shows the Maxwellian velocity distribution for neutrons at a temperature of 20° K.

There are many well known techniques for determining velocity distributions. One well known method involves the use of a velocity selector in front of the detector. This may be a pair of absorbing discs mounted on a common shaft and rotating in unison in the path of the neutron beam. Each of the discs contain a slot, but the slots are angularly displaced relative to one another. Thus, only those neutrons within a small range of velocities will be able simultaneously to traverse both slots in the rotating discs and impinge on the detector. By changing the speed of the rotating discs, a different range of neutron velocities is selected for passage. Thus, by scanning through an entire range of velocities with such a device, and measuring the neutron count rate for each small velocity interval, sufficient points are obtained of the Maxwell distribution for plotting purposes or to determine its peak or average velocity value. With this information, simply computation leads to the "temperature" of the detected neutrons.

Figure 5:
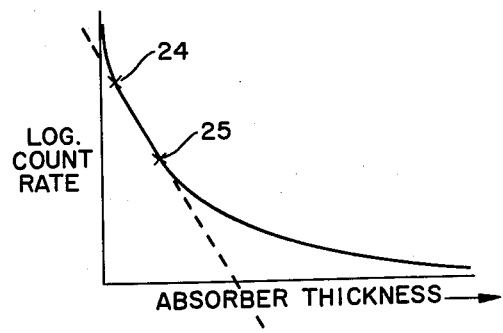
FIG. 5 is a graph relating the logarithm of the count rate to absorber thickness.

A simpler method involves the provision in front of the detector of neutron absorbers of varying thickness. FIG. 1 shows one such absorber 19. Suitable materials are borox, boron, lithium, indium and gold. The indium may have an average thickness of 5 mils for low temperature measurements. When the logarithm of the counting rate is plotted as a function of the absorber thickness, a curve as illustrated in FIG. 5 is produced. The slope of the straight line portion (indicated by the dotted line extension) gives the detected neutron cross-section, which in turn is inversely proportional to the square root of the absolute temperature of the emerging neutrons from the body. To determine the proportionality constant, the apparatus should be calibrated, which simply means carrying out the measurement on a body at a known temperature. Simple computation will then provide the temperature of a body at an unknown value. In practice, only two points are needed to determine the slope of the curve of the graph in FIG. 5. They are referred to by reference numerals 24 and 25, with the point 24 being obtained with a thin absorber, and the point 25 with a thicker absorber in position.

As will be clear from the foregoing, for the method of the invention to produce a meaningful answer, the incident neutrons must become "thermalized" in the body or substance whose temperature is to be measured. This requires that a minimum number of collisions take place before the higher-energy incident neutrons are sufficiently degraded in energy or slowed down to enter into thermal equilibrium with the body or substance. The number of collisions that take place depends upon the material of the body or substance. That is to say, the body or substance must be a moderator and thus able to slow down neutrons. This requires that it have a small atomic weight, and a good scattering cross-section for the neutrons. In addition, the neutrons should not be lost, so that the material should have a small capture cross-section for neutrons. With a good moderator material, at least a dozen collisions are necessary to achieve "thermalization." Most moderator materials fall into the first and second periods of the periodic table, and a sufficient amount of said material is necessary to furnish sufficient collisions. For example, about two inches of water at room temperature (300° K.) is necessary to "thermalize" incident neutrons with an energy of 1–5 mev. Under the same conditions, about one foot of graphite is necessary, its higher average atomic weight resulting in less energy loss per collision, thus requiring more material.

Below 300° K., mainly hydrogen-atom- or hydrogen-molecule-containing substances will function as moderators. This includes hydrogen alone, or hydrogen plugs oxygen, or hydrogen plus oxygen plus carbon, or deuterium. For example, $H_2$ is a moderator down to 100° K., and $H_2O$ down to 10° K., and HCCH down to less than 1° K. This does not mean that they will not function as moderators below the temperature indicated, but that excessively large amounts of material may become necessary, which would not normally be encountered in practice. For example, for carbon to act as a moderator at 20° K., one cubic foot of the material would be necessary.

This limitation noted above is not as restricting as it first appears. Materials containing water of hydration, which includes many oxides and salts, will function as moderators down to 10° K. This also applies to the paramagnetic salts which have been employed to produce temperatures below 1° K. In addition, where hydrogen atoms or molecules are not present in the material, a hydrogen source may be incorporated into it. For example, a metal container holding a supply of water may be immersed within the body or substance whose temperature is to be measured, or may be positioned adjacent the body or substance in thermal conductive relationship therewith, so that the water supply assumes the same temperature as that of the body or substance, and it can serve as the neutron moderator or "thermalizer."

Figure 3:
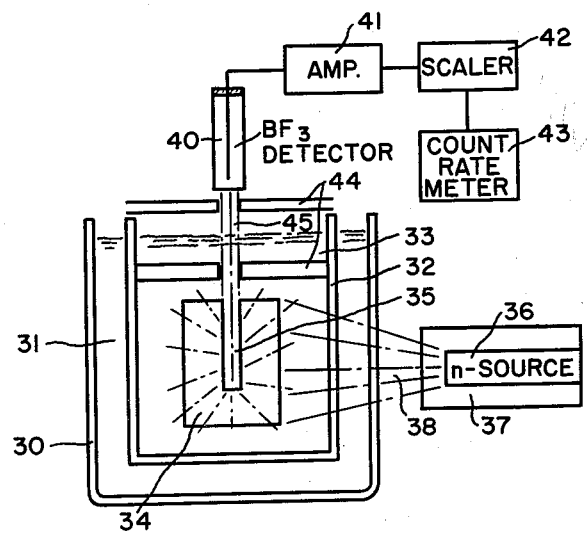
FIG. 3 illustrates, schematically, one form of apparatus with which the invention was actually reduced to practice.

The apparatus and method of the invention have been actually reduced to practice, and this apparatus is schematically illustrated in FIG. 3. It comprises an outer, double-walled, Dewar vessel or vacuum bottle 30 containing liquid nitrogen 31. Within the liquid nitrogen 31 was suspended an inner Dewar vessel 32 containing liquid nitrogen 33. Within the liquid nitrogen 33 was suspended a cylindrical block of ice 34 having a diameter of about 3¼ inches, and a height of about 9 inches. A hole 35 was bored into the block 34 from its top surface to a depth of about 4 inches, with a diameter of about ⅝ inch. A neutron source 36 was positioned laterally of the ice block 34. It comprised a Van de Graaf generator, though radium-beryllium radioactive material would be preferred. A water moderator 37 was provided, as schematically illustrated in the drawing. The emerging neutron beam 38 thus had a temperature of about 300° K. The ice, of course, was at the temperature of the liquid nitrogen, 77° K. While indium foils located in the bore 35 were used as the detector for simplicity, it is preferred to use a boron trifluoride proportional counter detector 40 positioned above the ice block 34 with its neutron receiving end in registration with the block bore 35. To the detector output may be coupled in succession a linear pulse amplifier 41, scaler circuits 42, and a counting rate meter 43. Pin-hole diaphragms 44 of boron may serve as the collimator. The emerging "thermalized" neutrons 45 are detected and the counting rate recorded. In general, a correction in the resultant rate will have to be made for fast neutrons and counter background.

In the actual practice of the invention, a packet of indium foils backed by cadmium was employed as the neutron detector. The sample or block 34 was first maintained at room temperature, 300° K. It was then a liquid and supported in a container with a well of the shape illustrated in the figure. Two indium foils were measured, the third and the seventh in order in the packet, each of the foils having a thickness of about 0.1 gm./cm.² The logarithm of the intensity of the radioactivity of the foils was plotted against the location of the respective foil in the packet. From the resultant intensity measurement was subtracted the contribution due to fast neutrons and counter background, as is conventionally done in this art. This has been described in the earliest work of Fermi in the discovery of the chain reaction. See his patents, Nos. 2,780,595; 2,798,847; 2,807,581, especially the lowest numbered one, for the details of this technique. The corrected intensities were 31 and 16, at positions 0.38 gm./cm.² apart. From this was calculated a value of approximately 300 barns for the effective neutrons cross-section of the detected neutrons, from the well known-formula $$\frac{I_2}{I_1} = e^{-\frac{\sigma m A_0}{A}}$$

where $I_1$ and $I_2$ are the respective intensities, $\sigma$ the neutron cross-section, $m$ the mass per square centimeter of the foil, $A_0$ Avogadro's number, and $A$ the atomic weight of the indium.

Then the sample was maintained at 77° K., the corrected intensity for the third foil being measured as 19, and that of the seventh, 5.8, at positions 0.36 gm./cm.² apart. This gave a cross-section of approximately 600 barns for the detected neutrons. The ratio of the cross-sections should be inversely proportional to the square roots of the absolute temperatures, which it will be evident is actually the case.

While the invention has been described in connection with specific embodiments, other modifications thereof will be readily apparent to those skilled in this art without departing from the spirit and scope of the invention as defined in the appendant claims.

What is claimed is:

1. Apparatus for measuring the temperature of a substance, comprising means for generating and introducing neutrons into the substance, said substance having a well in non-registered relation to the introduced neutrons, a narrow collimating system in registration with the well for passing only those neutrons that emerge from deep within the well and for arresting other neutrons, and means for detecting and determining the energy of those neutrons that traverse the collimating system.

2. Apparatus as set forth in claim 1 wherein the generating means comprise a radioactive substance.

3. Apparatus as set forth in claim 2 wherein a moderator surrounds the generating means.

4. A method for measuring the temperature of a substance, comprising introducing neutrons into the substance and causing the neutrons to penetrate deep within the substance to undergo sufficient collisions with the substance nuclei to attain thermal equilibrium therewith and finally to emerge from deep within the substance, detecting the said neutrons that emerge from deep within the substance and are in thermal equilibrium therewith, and measuring the energy of the detected neutrons in thermal equilibrium with the substance to obtain an indication of the temperature of the substance.

5. A method for measuring the temperature of a substance, comprising introducing neutrons into the substance and causing the neutrons to penetrate deep within the substance to undergo at least a dozen collisions with the substance nuclei and to attain thermal equilibrium therewith and finally to emerge from deep within the substance, detecting the said neutrons that emerge from deep within the substance and are in thermal equilibrium therewith, and comparing the energy of the detected neutrons in thermal equilibrium with the substance with the energy of neutrons at a known temperature to determine the temperature of the substance.

6. A method as set forth in claim 5, wherein a hydrogen-containing material is placed in thermal equilibrium with the substance whose temperature is to be measured, and the neutrons are introduced into the hydrogen-containing material to determine its temperature and thus that of the substance with which it is in thermal equilibrium.

7. A method of measuring the temperature of a substance, comprising introducing a beam of neutrons into the substance and causing the neutrons to penetrate deep within the substance to undergo at least a dozen collisions with the substance nuclei and to attain thermal equilibrium therewith and finally to emerge from deep within the substance, detecting the said neutrons that emerge from deep within the substance and are in thermal equilibrium therewith, and measuring the flux of the detected neutrons with different absorbers in the path of the emerging neutrons and utilizing these measurements to determine the temperature of the substance whose temperature is being measured.

8. Apparatus for measuring the temperature of a substance, comprising means for generating and introducing neutrons into the substance, said substance having a well in non-registered relation to the introduced neutrons, a narrow collimating system in registration with the well for passing only those neutrons that emerge from deep within the well and for arresting other neutrons, and means including a radiation counter for detecting, and measuring the energy of, those neutrons that traverse the collimating system.

9. Apparatus as set forth in claim 8 wherein absorbing means are interposed between the substance and the radiation detecting means.

References Cited in the file of this patent

A Survey of Neutron Thermalization Theory, by Cohn, International Conference on Peaceful Uses of Atomic Energy, United Nations Press, 1955, vol. 5, pages 405 to 415.

Neutron Temperature Measurements With Pulsed Neutron Sources, by Santandrea et al., from Second United Nations International Conference on the Peaceful Uses of Atomic Energy, United Nations Publication, 1958, vol. 16, pp. 265–269.